United States Patent
Kitamura

(10) Patent No.: US 9,316,168 B2
(45) Date of Patent: Apr. 19, 2016

(54) INTERNAL COMBUSTION ENGINE AND CONTROL DEVICE FOR FUEL PUMP

(71) Applicant: HONDA MOTOR CO., LTD., Tokyo (JP)

(72) Inventor: Natsuko Kitamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 14/325,371

(22) Filed: Jul. 8, 2014

(65) Prior Publication Data

US 2015/0040873 A1 Feb. 12, 2015

(30) Foreign Application Priority Data

Aug. 7, 2013 (JP) .................................. 2013-163969

(51) Int. Cl.
*F02M 51/04* (2006.01)
*F02D 41/20* (2006.01)
*F02D 41/38* (2006.01)
*F02M 59/36* (2006.01)
*F02D 41/40* (2006.01)

(52) U.S. Cl.
CPC ............ *F02D 41/20* (2013.01); *F02D 41/3845* (2013.01); *F02D 41/406* (2013.01); *F02M 59/368* (2013.01); *F02D 2041/2006* (2013.01); *F02D 2041/2082* (2013.01); *F02D 2200/0602* (2013.01); *Y02T 10/44* (2013.01)

(58) Field of Classification Search
CPC ................ F02D 2041/2006; F02D 2041/2017; F02D 2041/2027; F02D 2041/2048; F02D 2041/2082; F02M 25/08; F02M 37/08; F02M 2037/082; F02M 2037/085; F02M 51/04; F02M 59/366; F02M 59/466; F02M 63/0017; F02M 63/005

USPC .................... 123/497–499, 506; 251/129.15; 361/156, 160

See application file for complete search history.

(56) References Cited

U.S. PATENT DOCUMENTS

| 6,332,454 | B1 * | 12/2001 | Itabashi | F02D 41/062 123/490 |
| 2004/0139946 | A1 * | 7/2004 | Hamada | F02M 37/04 123/458 |
| 2008/0083895 | A1 * | 4/2008 | Ueda | F02D 41/20 251/129.15 |
| 2009/0120412 | A1 * | 5/2009 | Tokuo | F02M 59/102 123/506 |
| 2013/0340721 | A1 * | 12/2013 | Suda | F02D 41/221 123/496 |

FOREIGN PATENT DOCUMENTS

| JP | 2008-063993 | 3/2008 |
| JP | 2009-243416 | 10/2009 |

* cited by examiner

*Primary Examiner* — John Kwon
*Assistant Examiner* — Johnny H Hoang
(74) *Attorney, Agent, or Firm* — Mori & Ward, LLP

(57) ABSTRACT

A control device for a fuel pump includes a power storage and a discharger. The fuel pump includes an electromagnetic valve. The power storage is configured to store surge current generated upon stopping supplying electric power to the electromagnetic valve. One end of the power storage is connected to a negative electrode terminal of the electromagnetic valve. Another end of the power storage is connected to a power supply. The discharger is configured to connect the power storage and a positive electrode terminal of the electromagnetic valve upon starting supplying electric power to the electromagnetic valve to discharge an electric charge stored in the power storage.

15 Claims, 7 Drawing Sheets

INTERNAL COMBUSTION ENGINE AND CONTROL DEVICE FOR FUEL PUMP

CROSS-REFERENCE TO RELATED APPLICATIONS

The present application claims priority under 35 U.S.C. §119 to Japanese Patent Application No. 2013-163969, filed Aug. 7, 2013, entitled "Control Device for Fuel Pump." The contents of this application are incorporated herein by reference in their entirety.

BACKGROUND

1. Field

The present disclosure relates to an internal combustion engine and a control device for a fuel pump.

2. Description of the Related Art

A high pressure fuel pump of an internal combustion engine compresses the fuel which is fed from a fuel tank and supplies the high pressure fuel to a fuel injection valve provided in the internal combustion engine (see, for example, Japanese Unexamined Patent Application Publication No. 2009-243416). The high pressure fuel pump includes a pump shaft that rotates in synchronism with the rotation of the internal combustion engine, and a plunger that reciprocates in a cylinder according to a profile of the pump shaft. The high pressure fuel pump generates high pressure fuel by compressing the fuel which is introduced into a pressure chamber by the plunger. Also, an electromagnetic valve is provided in a low pressure fuel path that extends from a fuel suction inlet to the pressure chamber. The flow rate of the fuel, which is introduced into the pressure chamber, is controlled by driving to open or close the electromagnetic valve based on a drive signal which is turned on or off in synchronism with the rotation of the internal combustion engine.

Japanese Unexamined Patent Application Publication No. 2008-63993 discloses a control device of such an electromagnetic valve. The disclosed control device uses a technology in which surge energy is collected by a capacitor, the surge energy being generated when a solenoid of the electromagnetic valve and a power supply are disconnected in response to turning off of the drive signal, and subsequently when the drive signal is turned on again, the energy, which has been charged in the capacitor, is discharged to the solenoid.

SUMMARY

According to one aspect of the present invention, a control device for a fuel pump for driving an electromagnetic valve of the fuel pump by energization control includes a surge current consumption unit, a power storage unit, and a discharge unit. The surge current consumption unit is provided between a negative electrode terminal of the electromagnetic valve and ground, and configured to consume surge current which is generated when energization of the electromagnetic valve is stopped. The power storage unit is configured to store the surge current which is generated when energization of the electromagnetic valve is stopped. One end of the power storage unit is connected between the negative electrode terminal and the surge current consumption unit. The other end is connected to a power supply. The discharge unit is configured to connect the power storage unit and a positive electrode terminal of the electromagnetic valve and to discharge an electric charge of the power storage unit when energization of the electromagnetic valve is started.

According to another aspect of the present invention, a control device for a fuel pump includes a power storage and a discharger. The fuel pump includes an electromagnetic valve. The power storage is configured to store surge current generated upon stopping supplying electric power to the electromagnetic valve. One end of the power storage is connected to a negative electrode terminal of the electromagnetic valve. Another end of the power storage is connected to a power supply. The discharger is configured to connect the power storage and a positive electrode terminal of the electromagnetic valve upon starting supplying electric power to the electromagnetic valve to discharge an electric charge stored in the power storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
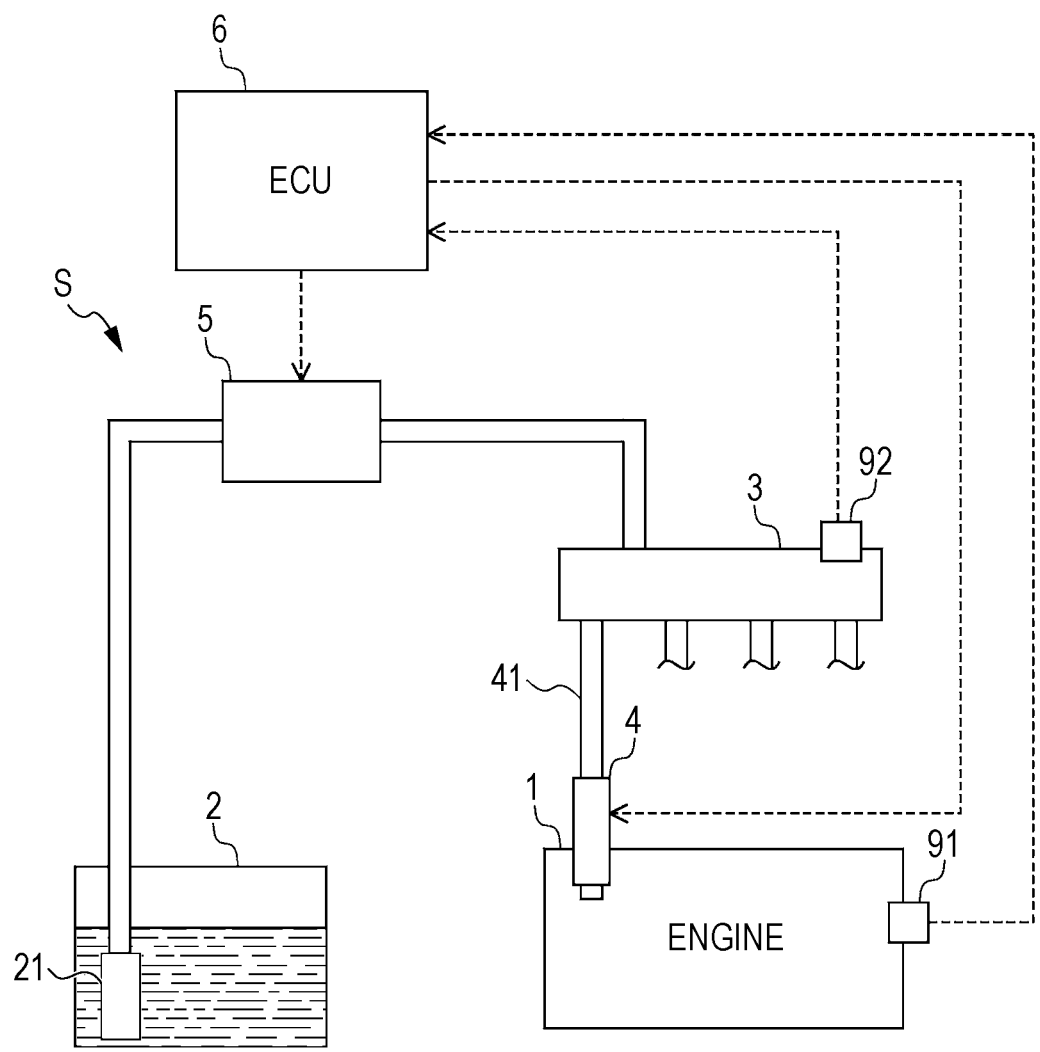
FIG. 1 is a diagram illustrating a configuration of an engine and a fuel supply system according to an embodiment of the present disclosure.

The embodiments will now be described with reference to the accompanying drawings, wherein like reference numerals designate corresponding or identical elements throughout the various drawings.

Hereinafter, an embodiment of the present disclosure will be described with reference to the accompanying drawings. FIG. 1 is a diagram illustrating the configuration of an internal combustion engine (hereinafter simply referred to as an "engine") 1 and a fuel supply system S. The fuel supply system S includes a fuel tank 2, a high pressure fuel pump 5, a delivery pipe 3, a fuel injection valve 4, and an electronic control unit (hereinafter referred to as an "ECU") 6 for these components.

The fuel tank 2 stores externally supplied fuel. The fuel tank 2 is provided with a fuel pump unit 21 that compresses and feeds fuel to the high pressure fuel pump 5. The high pressure fuel pump 5 further compresses the fuel, which has been compressed and fed by the fuel pump unit 21, using the power generated by the engine 1, and supplies the compressed fuel to the delivery pipe 3. The specific configuration of the high pressure fuel pump 5 will be described below with reference to FIG. 2.

The delivery pipe 3 stores the high pressure fuel which is discharged from the high pressure fuel pump 5. The fuel injection valve 4 is provided for each of a plurality of cylinders (not illustrated) of the engine 1. FIG. 1 illustrates only one of a plurality of the fuel injection valves 4. Each of the fuel injection valves 4 is connected to the delivery pipe 3 via a fuel supply pipe 41. The ECU 6 drives to open or close the fuel injection valve 4 at appropriate timing according to an operational state of the engine 1, thereby injecting the high pressure fuel in the delivery pipe 3 to each of the cylinders of the engine 1. A description of detailed steps of the fuel injection control by the ECU 6 is omitted.

The ECU 6 is an electronic control unit that controls various devices provided in the engine 1 and the fuel supply system S. The ECU 6 includes a CPU and drive circuits that drive the various devices based on calculation by the CPU. In order to recognize states of the engine 1 and the fuel supply system S, a plurality of sensors 91, 92 is connected to the ECU 6.

A crank angle sensor 91 transmits a pulse signal to the ECU 6 for every predetermined crank angle according to the rotation of a crankshaft (not illustrated) of the engine 1. The ECU 6 recognizes the rotational speed of the engine 1 based on the pulse signal from the crank angle sensor 91.

The fuel pressure sensor 92 detects a fuel pressure in the delivery pipe 3 and transmits a signal to the ECU 6, the signal being substantially proportional to a detected value. The ECU 6 controls the amount (hereinafter referred to as a "fuel discharge amount") of the fuel which is discharged from the high pressure fuel pump 5 to the delivery pipe 3, based on the detected signal from the fuel pressure sensor 92.

Figure 2:
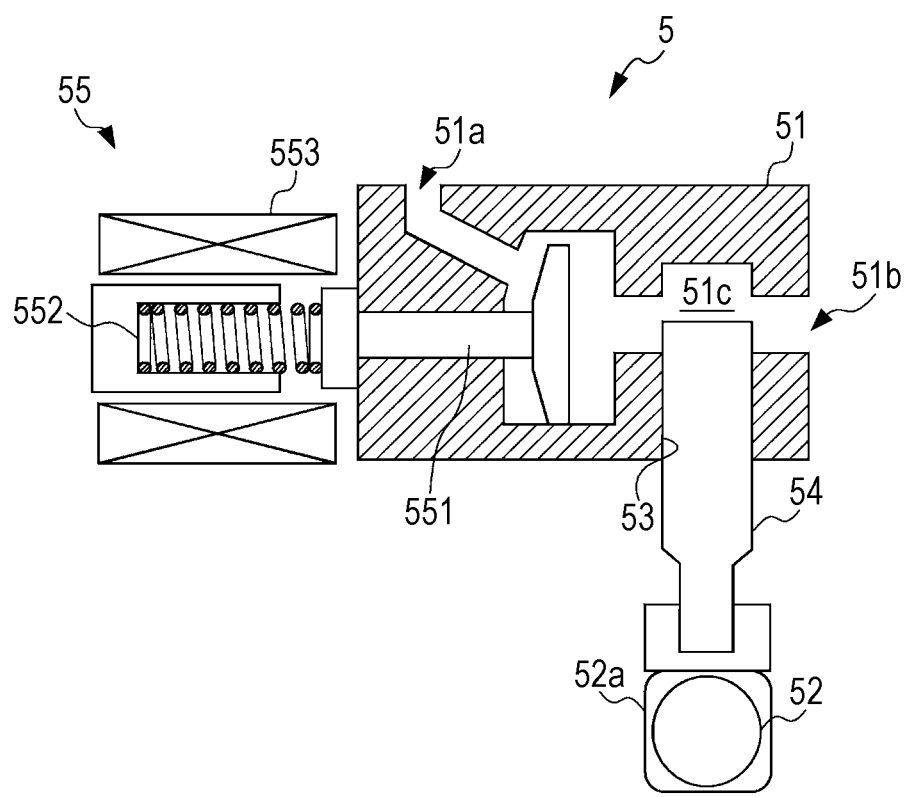
FIG. 2 is a diagram schematically illustrating a configuration of a high pressure fuel pump.

FIG. 2 is a diagram schematically illustrating the configuration of the high pressure fuel pump 5. The high pressure fuel pump 5 includes a housing 51 in which a suction inlet 51a and a discharge outlet 51b for fuel are formed; a pump shaft 52; a cylinder 53 that is formed in the housing 51 and extends in a radial direction from the rotation axis of the pump shaft 52; a plunger 54 which is reciprocatably housed in the cylinder 53; and a flow rate control valve 55 that controls a flow rate of fuel which flows in a pressure chamber 51c formed in the cylinder 53. The high pressure fuel pump 5 feeds fuel to the pressure chamber 51c through the suction inlet 51a, compresses the fuel in the pressure chamber 51c by the plunger 54, thereby discharging high pressure fuel through the discharge outlet 51b.

The pump shaft 52 is connected to the crankshaft of the engine 1 so as to rotate in synchronism with the crankshaft. When the pump shaft 52 rotates, the plunger 54 is reciprocated in the cylinder 53 according to the shape of a cam 52a formed in the pump shaft 52. The plunger 54 is reciprocated through one cycle, for example, for every 240 degrees of crank angle.

The flow rate control valve 55 includes a cylindrical valve element 551 that opens and closes the pressure chamber 51c; a spring 552 that urges the valve element 551 in a valve opening direction; and a solenoid 553 that, when energized, drives the valve element 551 in a valve closing direction against the elastic force of the spring 552 by an electromagnetic force. FIG. 2 illustrates a state (valve open state) in which the solenoid 553 is in a non-energized state and the valve element 551 is seated by the elastic force of the spring 552. That is, although the flow rate control valve 55 is so-called a normal open valve that is fully open in a non-energized state, the present disclosure is not limited to this.

Figure 3:
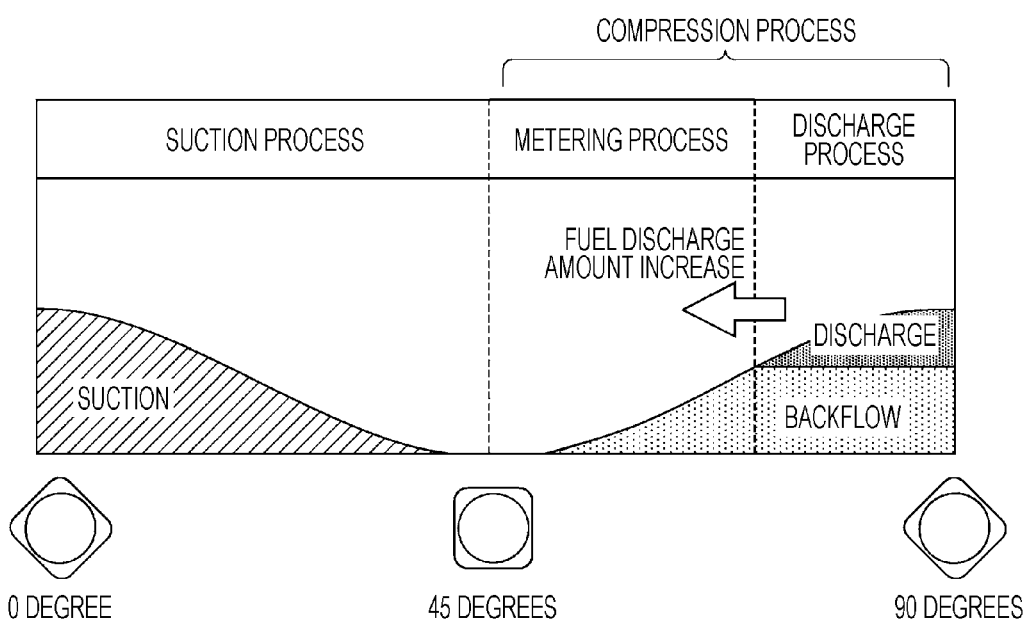
FIG. 3 is a chart schematically illustrating steps of discharging high pressure fuel by the high pressure fuel pump.

In the following, specific steps of discharging high pressure fuel by the above-described high pressure fuel pump 5 will be described with reference to FIG. 3. As illustrated in FIG. 3, in the present embodiment, one cycle of the plunger is defined by the time from when the plunger is at the top dead center until the plunger reaches the top dead center again through the bottom dead center. One cycle process is divided into a suction process and a compression process, the suction process corresponding to the interval in which the plunger moves from the top dead center to the bottom dead center, the compression process corresponding to the interval in which the plunger moves from the bottom dead center to the top dead center.

In the suction process, fuel is sucked into the pressure chamber 51c through the suction inlet 51a by a negative pressure which is generated as the plunger moves. In the suction process, in order to allow fuel to flow into the pressure chamber 51c through the suction inlet 51a, the flow rate control valve 55 is basically set in a valve open state (energization of the solenoid is stopped).

In the compression process, the fuel in the pressure chamber 51c is compressed by the plunger. In the case where the flow rate control valve 55 is in a valve open state when the plunger moves from the bottom dead center to the top dead center, fuel flows back to the suction inlet 51a from the pressure chamber 51c and thus the amount of fuel discharged from the discharge outlet 51b decreases. Thus, the compression process is divided into a metering process and a discharge process as illustrated in FIG. 3, the metering process in which the flow rate control valve 55 is in a valve open state and the fuel in the pressure chamber 51c flows back to the suction inlet 51a, the discharge process in which the flow rate control valve 55 is in a valve closed state and the fuel in the pressure chamber 51c is discharged through the discharge outlet 51b.

As described above, in the compression process, the amount of fuel which flows back to the suction inlet 51a from the pressure chamber 51c decreases as the metering process is shortened, in other words, as the flow rate control valve 55 is closed earlier, and eventually the fuel discharge amount of the high pressure fuel pump 5 increases. That is, in the above-described high pressure fuel pump, the fuel discharge amount can be controlled by adjustment of a closing time of the flow rate control valve 55.

Figure 4:
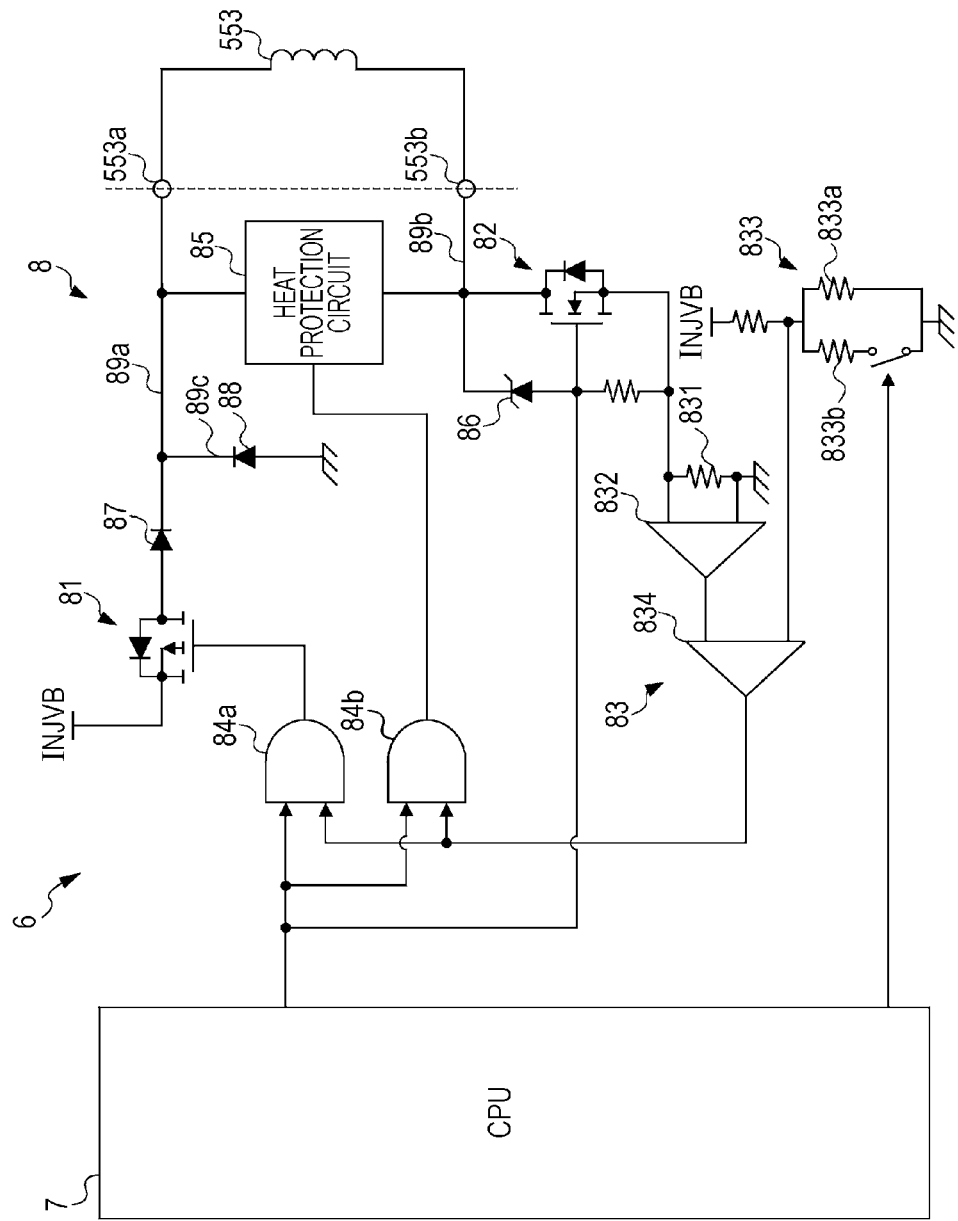
FIG. 4 is a circuit diagram illustrating configurations of a solenoid of a flow control valve and an ECU.

FIG. 4 is a circuit diagram illustrating the configurations of the solenoid 553 of the flow control valve 55 and the ECU 6. The ECU 6 includes a CPU 7 and a drive circuit 8. The CPU 7 generates a drive signal based on the outputs of the crank angle sensor 91 and/or the fuel pressure sensor 92, the drive signal for defining a drive time at which the solenoid 553 is to be energized (that is, a closing time of the flow rate control valve 55). The drive circuit 8 is connected to a positive electrode terminal 553a and a negative electrode terminal 553b of the solenoid 553 and drives the solenoid 553 at appropriate timing based on the drive signal from the CPU 7.

The CPU 7 calculates an engine rotational speed based on the output of the crank angle sensor 91, and calculates a fuel discharge amount based on the output of the fuel pressure sensor 92, the fuel discharge amount being necessary to make the fuel pressure in the delivery pipe 3 reach a predetermined target pressure, and further generates a drive signal of the solenoid 553 based on the engine rotational speed and the fuel discharge amount. As described with reference to FIG. 4, the plunger is reciprocated by the pump shaft 52 that rotates in synchronism with the crankshaft, the flow rate control valve 55 is opened or closed at appropriate timing according to the reciprocation of the plunger, and fuel is thereby discharged from the high pressure fuel pump 5. Thus, the CPU 7 sets a period of a drive signal of the solenoid 553 such that the period is inversely proportional to the engine rotational speed. Also, the amount of fuel discharged from the high pressure fuel pump increases as the flow rate control valve 55 is closed earlier. Thus, the CPU 7 switches the drive signal from OFF to ON earlier as the calculated necessary amount of fuel discharge increases.

The drive circuit 8 includes Hi side switching element 81 and Lo side switching element 82; a feedback circuit 83 to generate a feedback signal so that the current which flows through the solenoid 553 has a substantially constant current; two AND circuits 84*a*, 84*b* to receive a drive signal and a feedback signal as inputs; a heat protection circuit 85 to protect the Lo side switching element 82 from generated heat; and a Zener diode 86, the Hi side switching element 82 and Lo side switching element 83 being respectively provided on an upstream path 89*a* and a downstream path 89*b* out of an energizing path of the solenoid 553 from power supply INJVB for driving the fuel pump to ground GND.

The Hi side switching element 81 is provided on the upstream path 89*a*. When the output signal of the AND circuit 84*a* is turned ON, the Hi side switching element 81 connects the power supply INJVB and the positive electrode terminal 553*a*, whereas when the output signal is turned OFF, the Hi side switching element 81 disconnects the power supply INJVB from the positive electrode terminal 553*a*. The below-described backflow prevention diode 87 is provided on part of the upstream path 89*a* which is nearer to the positive electrode terminal 553*a* with respect to the Hi side switching element 81, the backflow prevention diode being configured to prevent backflow of current from the heat protection circuit 85 to the Hi side switching element 81.

In addition, a return current path 89*c* is provided on part of the upstream path 89*a* which is nearer to the positive electrode terminal 553*a* with respect to the backflow prevention diode 87. The return current path 89*c* connects the positive electrode terminal 553*a* and the grand GND. Also, the return current path 89*c* is provided with a diode 88 for return current that prevents current flow from the upstream path 89*a* to the grand GND. The return current path 89*c* is provided so as to allow a surge current to flow from the grand GND to the solenoid 553 when the Hi side switching element 81 is turned OFF.

When a drive signal outputted from the CPU 7 is turned ON, the Lo side switching element 82 connects the negative electrode terminal 553*b* and the grand GND, and starts to energize the solenoid 553. Also, when the drive signal is turned OFF, the Lo side switching element 82 disconnects the negative electrode terminal 553*b* from the grand GND and stops energization to the solenoid 553. The Zener diode 86 connects between the gate and drain of the Lo side switching element 82. The Zener diode 86 is provided such that the cathode faces the negative electrode terminal 553*b*.

The AND circuits 84*a*, 84*b* each output a binary signal which takes ON or OFF value based on a drive signal of the solenoid 553 transmitted from the CPU 7 and a feedback signal transmitted from the feedback circuit 83. More specifically, the AND circuits 84*a*, 84*b* each output an ON signal only when both the drive signal and the feedback signal are ON, and output an OFF signal otherwise. The above-described Hi side switching element 81 is driven according to an output of the AND circuit 84*a*. The heat protection circuit 85 is driven according to an output of the AND circuit 84*b*.

The feedback circuit 83 includes a current sensing resistor 831 provided on the energizing path of the solenoid 553; an operational amplifier 832 to detect voltage Vr of the resistor 831; a reference resistor 833 which is provided between the power supply INJVB and the grand GND to generate a predetermined reference voltage Vb; and a comparator 834 to change an output according to the sign of the difference (Vb−Vr) between the two voltages.

As illustrated in FIG. 3, the reference resistor 833 is formed by connecting two resistors 833*a*, 833*b* in parallel. One resistor 833*b* out of these two resistors 833*a*, 833*b* is provided with a switching element 833*c*. The switching element 833*c* is turned ON or OFF based on a command signal from the CPU 7. Therefore, the magnitude of the reference voltage Vb inputted to the comparator 834, and eventually the magnitude of the below-described drive current (see FIG. 6 described later) can be changed based on a command signal from the CPU 7.

The comparator 834 generates a feedback signal according to the sign of the difference Vb−Vr between the two voltages. More specifically, when the voltage Vb is higher than Vr, the comparator 834 turns ON the feedback signal, and when the voltage Vb is Vr or lower, the comparator 834 turns OFF the feedback signal. As described above, only when both the drive signal and the feedback signal are ON, the Hi side switching element 81 connects the power supply INJVB and the positive electrode terminal 553*a*, and when the feedback signal is turned OFF, the Hi side switching element 81 disconnects the power supply INJVB from the positive electrode terminal 553*a*. Therefore, while the drive signal is ON, the feedback signal is switched between ON and OFF so that the current flowing through the current sensing resistor 831 is substantially constant, and eventually the Hi side switching element 81 is turned ON or OFF (see the below-described FIG. 6).

Figure 5:
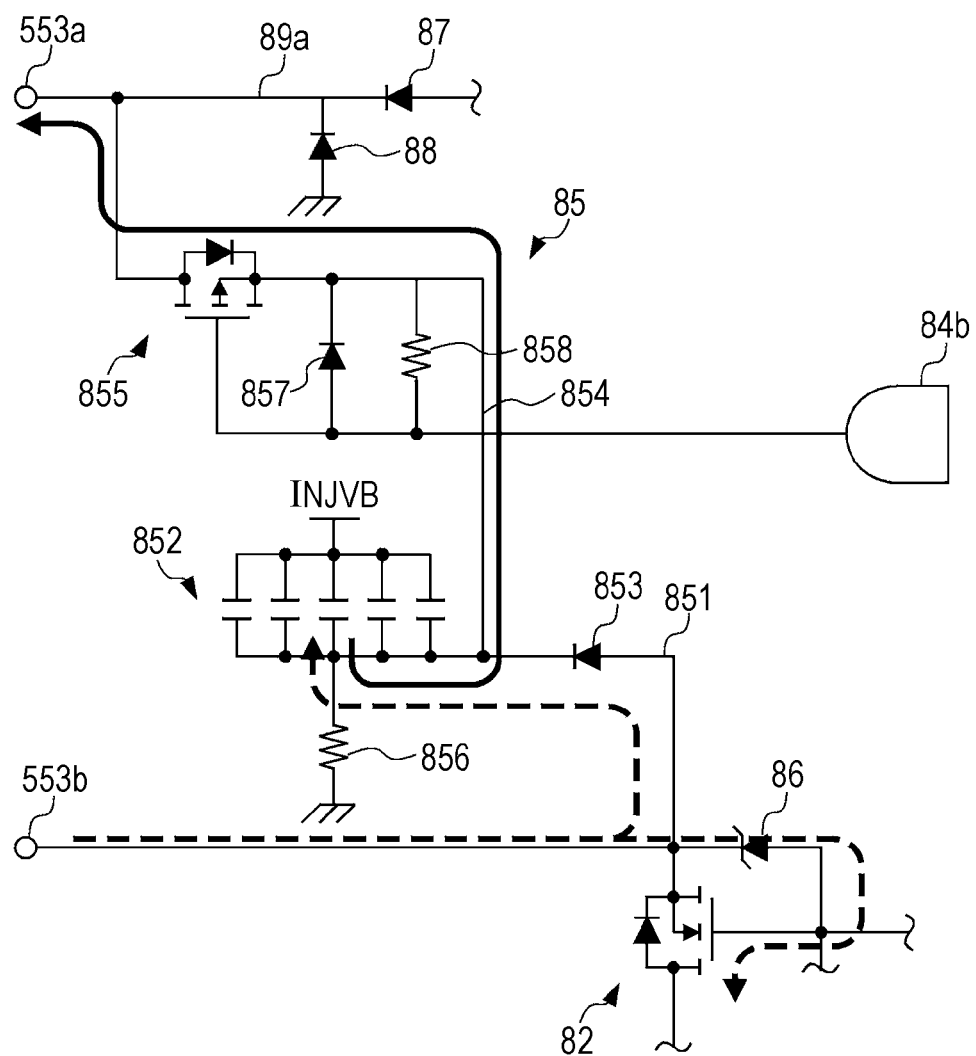
FIG. 5 is a circuit diagram illustrating a configuration of a heat protection circuit.

FIG. 5 is a circuit diagram illustrating the configuration of the heat protection circuit 85. As illustrated in FIG. 5, the heat protection circuit 85 is connected to both terminals 553*a*, 553*b* of the solenoid 553, and stores part of the surge current which is generated when energization to the above-described solenoid 553 is stopped, and discharges the stored electric charge when energization to the solenoid 553 is started.

The heat protection circuit 85 includes a collection path 851 to connect part of the downstream path 89*b* and the power supply INJVB for driving the fuel pump; a capacitor 852 for surge current collection and a backflow prevention diode 853 that are provided on the collection path 851; a discharge path 854 to connect part of the collection path 851 and the positive electrode terminal 553*a*; and a switching element 855 for electrical discharge provided on the discharge path 854, the part of the downstream path 89*b* being nearer to the negative electrode terminal 553*b* with respect to the Lo side switching element 82 and a surge current consumption circuit 86, the part of the collection path 851 being nearer to the negative electrode terminal 553*b* with respect to the capacitor 852.

One end of the capacitor 852 is connected to the negative electrode terminal 553*b* via the collection path 851 and the other end thereof is connected to the power supply INJVB. The capacitor 852 stores part of surge current through the collection path 851, the surge current being generated when energization to the solenoid 553 is stopped. An optimal capacity of the capacitor 852 is determined by the steps that will be described below with reference to FIGS. 6 and 7. One end of the capacitor 852 is connected to the grand GND via a resistor 856.

When the output signal of the AND circuit 84*b* is turned ON, the switching element 855 for electrical discharge connects the capacitor 852 and the positive electrode terminal 553*a*, and discharges the electric charge of the capacitor 852 to the solenoid 553 through the discharge path 854. When the output signal of the AND circuit 84*b* is turned OFF, the switching element 855 for electrical discharge disconnects the capacitor 852 from the positive electrode terminal 553*a* and stops electrical discharge from the capacitor 852. The discharge path 854 is provided with a diode 857 and a resistor 858 that connect between the gate and source of the switching element 855 for electrical discharge.

Figure 6:
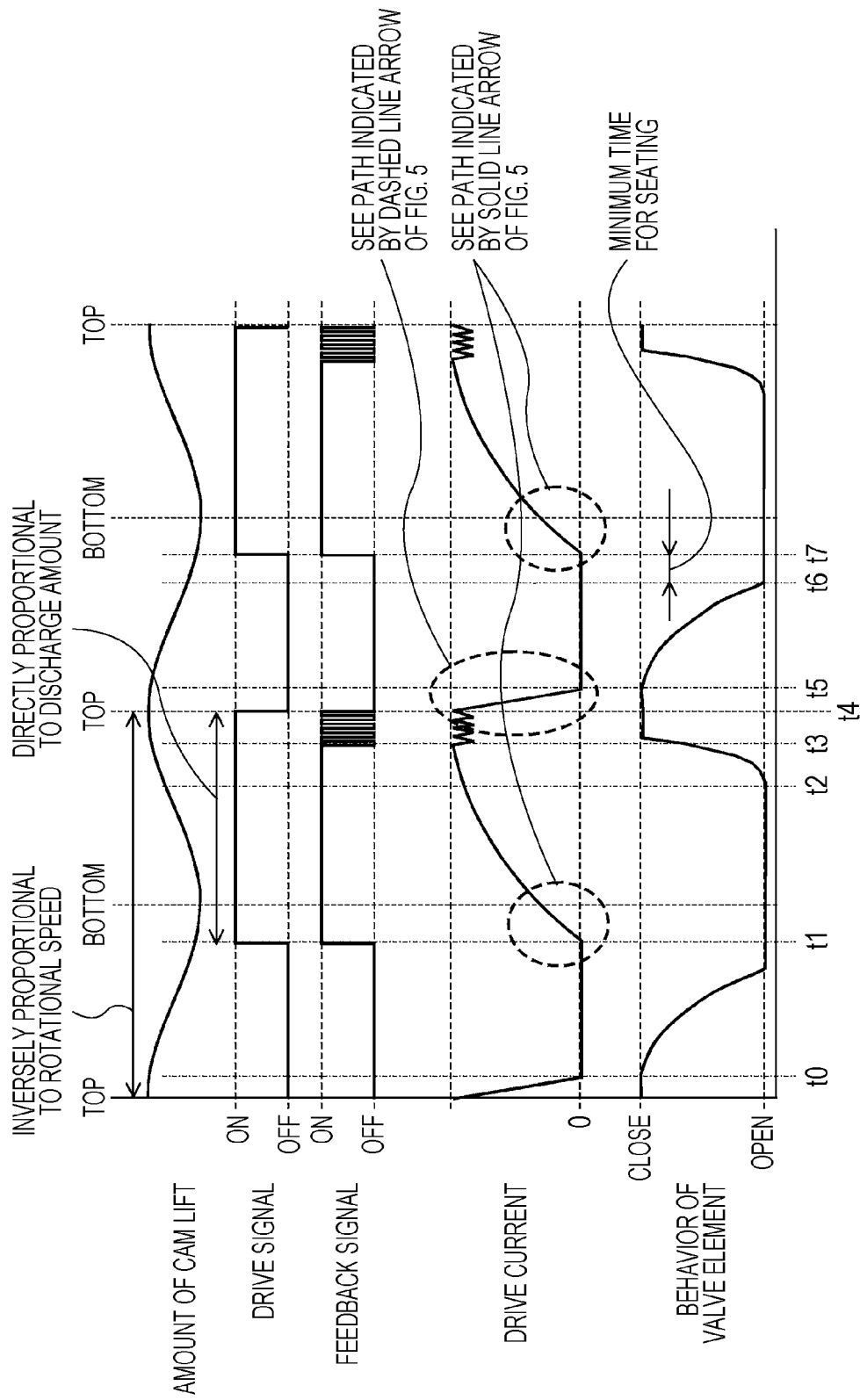
FIG. 6 is a time chart indicating the operation of the high pressure fuel pump and the ECU.

A specific operation example of the high pressure fuel pump 5 and the control device configured in the above manner will be described in the following. FIG. 6 is a time chart indicating the operation of the high pressure fuel pump. From the top row to the bottom, FIG. 6 indicates the amount of cam lift corresponding to the amount of movement of the plunger, the drive signal, the feedback signal, the drive current corresponding to the current which flows through the solenoid 553, and the behavior of actual valve element. FIG. 6 illustrates an example in which each of the engine rotational speed and the fuel discharge amount is maintained at a constant value.

First, change in the amount of cam lift will be described. As described above, the pump shaft 52 of the high pressure fuel pump 5 rotates in synchronism with the crankshaft of the engine 1, and thus the period of variation in amount of cam lift decreases inversely with the engine rotational speed.

Next, change in drive signal will be described. As illustrated in FIG. 6, the period of variation in drive signal is the same as the period of variation in amount of cam lift. Therefore, the period of variation in drive signal decreases inversely with the engine rotational speed. As described with reference to FIG. 3, in a process in which the amount of cam lift increases, the amount of fuel flowing back from the pressure chamber decreases and the amount of fuel discharged from the pressure chamber increases as the valve element is closed earlier. Consequently, the CPU sets an earlier time for switching a drive signal from OFF to ON as necessary fuel discharge amount increases.

Next, the drive current and the behavior of the valve element in the case where the drive signal is set in the manner as illustrated in FIG. 6 will be described with reference to the circuit diagrams of FIGS. 4 and 5. First, the drive signal is OFF between time t0 and time t1. When the drive signal is OFF, each of the three switching elements 81, 82, 855 is OFF as described with reference to FIGS. 4 and 5. Therefore, no current flows through the solenoid 553 and thus the drive current is 0. When the drive current is 0, the voltage Vr across the current sensing resistor 831 of FIG. 4 is 0 and so lower than the reference voltage Vb, and thus the feedback signal is ON.

Subsequently, when the drive signal is switched from OFF to ON at time t1, each of the three switching elements 81, 82, 855 is turned ON. Consequently, the positive electrode terminal 553a of the solenoid 553 is connected to the power supply INJVB and the capacitor 852 of the heat protection circuit 85. In the above step, the capacitor 852 has been charged by the surge current that was generated when the drive signal was turned OFF last time. Therefore, immediately after the drive signal is turned ON, current flows into the positive electrode terminal 553a of the solenoid 553 from the capacitor 852 which has a higher potential (see the thick arrow indicated by a solid line of FIG. 5). Accordingly, as illustrated in FIG. 6, the drive current gradually increases after time t1.

Subsequently, at time t2, the valve element starts to move in a valve closing direction against the elastic force of the spring as a consequence of the increased drive current. Subsequently, at time t3, the drive current increases up to a predetermined value, the voltage Vr across the current sensing resistor 831 exceeds the reference voltage Vb, and thereby the feedback signal is turned OFF. Accordingly, the Hi side switching element 81 and the switching element 855 for electrical discharge are turned OFF while the Lo side switching element 82 remains to be ON, and thus the positive electrode terminal 553a is disconnected from the power supply INJVB and the capacitor 852. The switching elements 81, 855 are turned OFF, and thereby current, which flows back from the grand GND, starts to flow through the solenoid 553 and the drive current decreases as illustrated in FIG. 6. Also, when the drive current decreases, the feedback signal will be turned ON. Then, the power supply INJVB and the capacitor 852 are connected to the positive electrode terminal 553a again, and the drive current increases again. In FIG. 6, between time t3 and time t4, the feedback signal is turned ON and OF repeatedly in this manner, and the drive current is thereby held at substantially constant value and the valve element is maintained on a valve closing side.

Subsequently, when the drive signal is switched from ON to OFF at time t4, each of the three switching elements 81, 82, 855 is set in an OFF state. When energization to the solenoid 553 is stopped with the switching elements 81, 82, 855 OFF state, a surge current, which flows back from the ground, occurs in the solenoid 553. However, as indicated by a thick dashed arrow in FIG. 5, the surge current is charged in the capacitor 852 as well as consumed by the Zener diode 86, and thus the solenoid 553 is set in a non-energized state quickly. More specifically, when energization to the solenoid 553 is stopped, the capacitor 852 is charged primarily. Also, after the capacitor 852 is charged with a predetermined amount of electric charge, in response to achieving a high potential of the capacitor 852 exceeding the breakdown voltage of the Zener diode 86, a current flows through the Zener diode 86 secondarily. Consequently, the drive current quickly reduces to 0 over the interval of time t4 to t5 as illustrated in FIG. 6, and the solenoid 553 is set in a non-energized state.

When the solenoid 553 is set in a non-energized state at time t5, the valve element is subsequently urged to a valve opening side by the elastic force of the spring and a negative pressure generated in the pressure chamber, and then is seated at time t6. Subsequently, when the drive signal is switched from OFF to ON at time t7, each of the three switching elements 81, 82, 855 is turned ON, and the electric charge stored in the capacitor 852 is discharged to the solenoid 553. The operation after the time t7 is basically the same as the operation after the time t1, and thus description is omitted. Hereinafter, the minimum seating time is defined as the time interval (time interval from time t6 to t7 in FIG. 6) since the solenoid 553 is set in a non-energized state and the valve element is seated by the elastic force of the spring until the drive signal is switched from OFF to ON.

Here, the optimal capacity of the capacitor 852 will be described. As described with reference to FIG. 6, the valve element moves between the valve opening side and the valve closing side with a delay with respect to ON/OFF timing of the drive signal. As described above, the period of the drive signal decreases inversely with the engine rotational speed, and timing of switching the drive signal from OFF to ON is set earlier as the fuel discharge amount increases. Thus, in order to guarantee that the high pressure fuel pump 5 is in normal operation as commanded in all operating ranges of the engine rotational speed and the fuel discharge amount, it is necessary to ensure the minimum seating time longer than or equal to a predetermined time when each of the engine rotational speed and the fuel discharge amount takes a maximum. Because the valve element is seated after the drive signal is switched from ON to OFF and the solenoid 553 is set in a non-energized state, the minimum seating time decreases directly with the time interval (time interval from time t4 to t5 in FIG. 6) since the drive signal is switched from ON to OFF until the drive signal decreases to 0.

Figure 7:
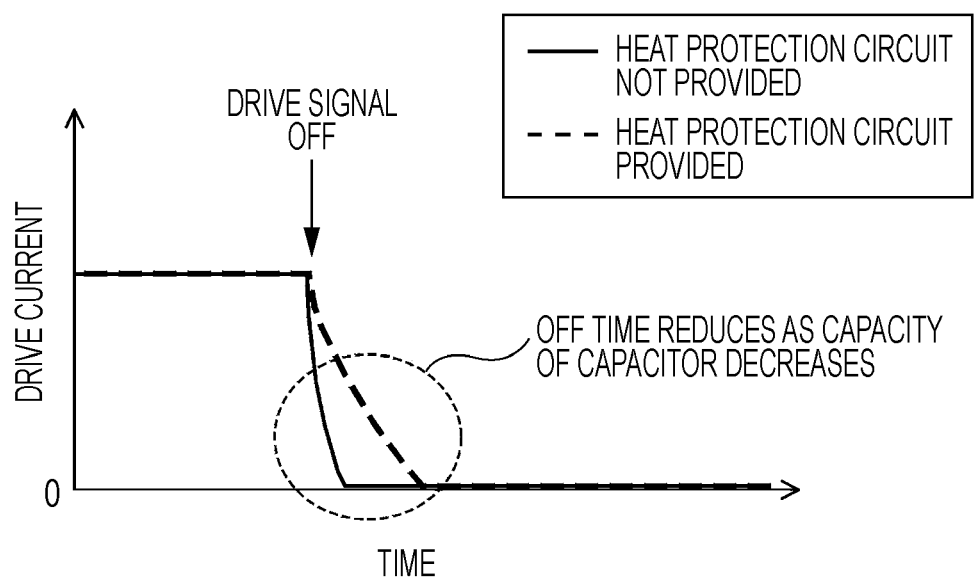
FIG. 7 is a chart schematically illustrating a change in drive current when a drive signal is switched from ON to OFF.

FIG. 7 is a chart schematically illustrating a change in the drive current when the drive signal is switched from ON to OFF. In FIG. 7, the thick dashed line indicates a change in the drive current in the case where the heat protection circuit 85 is provided, whereas the thin solid line indicates a change in the drive current in the case where the heat protection circuit is not provided. As illustrated in FIG. 7, the time interval (hereinafter referred to as an "OFF time of the drive current") since the drive signal is switched to OFF until the drive signal decreases to 0 is shorter in the case where the heat protection circuit is not provided than in the case where the heat protection circuit is provided. Therefore, from the result of FIG. 7, it is probable that the OFF time of the drive current increases as the capacity of the capacitor 852 of the heat protection circuit increases. As a consequence of what has been discussed above, the capacity of the capacitor of the heat protection circuit is preferably set such that the minimum seating time when each of the engine rotational speed and the fuel discharge amount takes a maximum is longer than or equal to a predetermined time.

(1) The embodiment of the present disclosure provides a control device (for example, the above-described ECU 6) of a fuel pump (for example, the above-described high pressure fuel pump 5) for driving an electromagnetic valve (for example, the above-described flow rate control valve 55) of the fuel pump by energization control, the fuel pump for compressing fuel, the control device including: a surge current consumption unit (for example, the above-described Zener diode 86) that is provided between a negative electrode terminal (for example, the above-described negative electrode terminal 553b) of the electromagnetic valve and ground, and configured to consume surge current which is generated when energization of the electromagnetic valve is stopped; a power storage unit (for example, the above-described capacitor 852) configured to store the surge current which is generated when energization of the electromagnetic valve is stopped, one end of the power storage unit being connected between the negative electrode terminal and the surge current consumption unit, the other end being connected to a power supply (for example, the above-described power supply INJVB); and a discharge unit (for example, the above-described switching element 855 for electrical discharge) configured to connect the power storage unit and a positive electrode terminal (for example, the above-described positive electrode terminal 553a) of the electromagnetic valve and to discharge an electric charge of the power storage unit when energization of the electromagnetic valve is started. Thus, the surge energy can be efficiently utilized. The collection of the surge energy by the power storage unit prevents the surge energy from being consumed intensively in the switching elements that perform energization control of the electromagnetic valve, and thus heat generation of the switching elements can be reduced. Also additional provision of the surge current consumption unit allows the surge current to be consumed without causing adverse effects on the collection of the surge energy by the power storage unit, and thus it is possible to reduce the time taken for the solenoid of the electromagnetic valve to be set in a non-energized state after energization to the electromagnetic valve is stopped.

(2) In this configuration, preferably, the surge current consumption unit operates after the power storage unit is charged with a predetermined quantity of electric charge by the surge current. Thus, the time taken for the solenoid of the electromagnetic valve to be set in a non-energized state can be reduced without causing adverse effects on the collection of the surge energy by the power storage unit as much as possible.

(3) In this configuration, preferably, the control device further includes: a drive signal generation unit (for example, the above-described CPU 7) configured to generate a drive signal of the electromagnetic valve according to a rotational speed of an internal combustion engine and a fuel discharge amount of the fuel pump; and a drive unit (for example, the above-described Hi side switching element 81 and Lo side switching element 82) that is provided on an energization path of the electromagnetic valve and configured to start energization of the electromagnetic valve when the drive signal is turned on and to stop the energization of the electromagnetic valve when the drive signal is turned off. Preferably, the electromagnetic valve includes an elastic body (for example, the above-described spring 552) that urges a valve element (for example, the above-described valve element 551) to one end side and an electromagnetic drive unit (for example, the above-described solenoid 553) to drive the valve element to the other end side against an elastic force of the elastic body by an electromagnetic force when the electromagnetic valve is energized, the power storage unit is a capacitor (for example, the above-described capacitor 852), and when a minimum seating time is defined as a time interval since the drive signal is turned off, the electromagnetic drive unit is set in a non-energized state, and the valve element is seated by the elastic force of the elastic body until the drive signal is switched from off to on, a capacity of the capacitor is set such that the minimum seating time when each of the rotational speed and the fuel discharge amount takes a maximum is longer than or equal to a predetermined time. When a capacitor is used as a power storage unit, the time taken for the solenoid to be set in a non-energized state after turn off of the drive signal depends on the capacity of the capacitor. Also, when each of the rotational speed of the internal combustion engine and the fuel discharge amount of the fuel pump takes a maximum, the time taken for the drive signal to be turned on again after turn off of the signal is the shortest. In the embodiment of the present disclosure, the above points are taken into consideration and the capacity of the capacitor is set in the above-described manner, and thus the surge energy can be efficiently utilized while guaranteeing normal operation of the fuel pump in all operating ranges.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a fuel pump for driving an electromagnetic valve of the fuel pump by energization control, the fuel pump for compressing fuel, the control device comprising:
   a surge current consumption unit that is provided between a negative electrode terminal of the electromagnetic valve and ground, and configured to consume surge current which is generated when energization of the electromagnetic valve is stopped;
   a power storage unit configured to store the surge current which is generated when energization of the electromagnetic valve is stopped, one end of the power storage unit being connected between the negative electrode terminal and the surge current consumption unit, the other end being connected to a power supply; and
   a discharge unit configured to connect the power storage unit and a positive electrode terminal of the electromagnetic valve and to discharge an electric charge of the power storage unit when energization of the electromagnetic valve is started.

2. The control device according to claim 1,
   wherein the surge current consumption unit operates after the power storage unit is charged with a predetermined quantity of electric charge by the surge current.

3. The control device according to claim 2, further comprising:

a drive signal generation unit configured to generate a drive signal of the electromagnetic valve according to a rotational speed of an internal combustion engine and a fuel discharge amount of the fuel pump; and a drive unit that is provided on an energization path of the electromagnetic valve and configured to start energization of the electromagnetic valve when the drive signal is turned on and to stop the energization of the electromagnetic valve when the drive signal is turned off, wherein the electromagnetic valve includes an elastic body that urges a valve element to one end side and an electromagnetic drive unit to drive the valve element to the other end side against an elastic force of the elastic body by an electromagnetic force when the electromagnetic valve is energized, the power storage unit is a capacitor, and when a minimum seating time is defined as a time interval since the drive signal is turned off, the electromagnetic drive unit is set in a non-energized state, and the valve element is seated by the elastic force of the elastic body until the drive signal is switched from off to on, a capacity of the capacitor is set such that the minimum seating time when each of the rotational speed and the fuel discharge amount takes a maximum is longer than or equal to a predetermined time.

4. A control device for a fuel pump which includes an electromagnetic valve, the control device comprising:

a power storage configured to store surge current generated upon stopping supplying electric power to the electromagnetic valve, one end of the power storage being connected to a negative electrode terminal of the electromagnetic valve, another end of the power storage being connected to a power supply; and a discharger configured to connect the power storage and a positive electrode terminal of the electromagnetic valve upon starting supplying electric power to the electromagnetic valve to discharge an electric charge stored in the power storage.

5. The control device according to claim 4, further comprising a surge current consumer, wherein the surge current consumer is provided between the negative electrode terminal of the electromagnetic valve and ground, wherein the surge current consumer is configured to consume surge current which is generated when supplying electric power to the electromagnetic valve is stopped, wherein the one end of the power storage is connected between the negative electrode terminal and the surge current consumer, and wherein the surge current consumer operates after the power storage is charged with a predetermined quantity of electric charge by the surge current.

6. The control device according to claim 5, further comprising:

a drive signal generator configured to generate a drive signal of the electromagnetic valve according to a rotational speed of an internal combustion engine and a fuel discharge amount of the fuel pump; and a driver that is provided on a path through which electric power is supplied to the electromagnetic valve and configured to start supplying electric power to the electromagnetic valve when the drive signal is turned on and to stop supplying electric power to the electromagnetic valve when the drive signal is turned off, wherein the electromagnetic valve includes an elastic body that urges a valve element to one end side and an electromagnetic driver to drive the valve element to another end side against an elastic force of the elastic body by an electromagnetic force when supplying electric power to the electromagnetic valve is started, the power storage comprises a capacitor, and when a minimum seating time is defined as a time interval since the drive signal is turned off, the electromagnetic driver is set in a state in which supplying electric power to the electromagnetic valve is stopped, and the valve element is seated by the elastic force of the elastic body until the drive signal is switched from off to on, a capacity of the capacitor is set such that the minimum seating time when each of the rotational speed and the fuel discharge amount takes a maximum is longer than or equal to a predetermined time.

7. The control device according to claim 4, wherein the electromagnetic valve comprises a normal open electromagnetic valve which is open when supplying electric power to the normal open electromagnetic valve is stopped, and wherein a fuel discharge amount of the fuel pump is variably controlled by control of a timing for closing the electromagnetic valve.

8. The control device according to claim 5, wherein the electromagnetic valve comprises a normal open electromagnetic valve which is open when supplying electric power to the normal open electromagnetic valve is stopped, and wherein a fuel discharge amount of the fuel pump is variably controlled by control of a timing for closing the electromagnetic valve.

9. The control device according to claim 6, wherein the electromagnetic valve comprises a normal open electromagnetic valve which is open when supplying electric power to the normal open electromagnetic valve is stopped, and wherein a fuel discharge amount of the fuel pump is variably controlled by control of a timing for closing the electromagnetic valve.

10. An internal combustion engine comprising the control device according to claim 4.

11. An internal combustion engine comprising the control device according to claim 5.

12. An internal combustion engine comprising the control device according to claim 6.

13. An internal combustion engine comprising the control device according to claim 7.

14. An internal combustion engine comprising the control device according to claim 8.

15. An internal combustion engine comprising the control device according to claim 9.

* * * * *